United States Patent Office 3,249,641
Patented May 3, 1966

3,249,641
CATALYST AND CYCLOOLEFIN PRODUCTION
Charles D. Storrs and Reginald F. Clark, Lake Charles, La., and Herbert G. Jackson, Houston, Tex., assignors, by mesne assignments, to Columbian Carbon Company, a corporation of Delaware
No Drawing. Filed June 14, 1962, Ser. No. 202,376
14 Claims. (Cl. 260—666)

This invention relates to the production of cyclic polyolefins and in particular to the production of cyclododecatriene. The invention also relates to certain new compositions of matter which are useful as catalysts for producing such cyclic polyolefins.

Complexes which are prepared by replacement of one or more carbonyl groups from nickel tetracarbonyl by various organo metals and organo derivatives of other elements and in particular the phosphines and phosphites, are well known in the prior art, some of the basic work being done by Reed, in utilizing such complexes as catalysts, and described in his U.S. patents numbered 2,686,208 and 2,686,209. Similar catalysts have also been described which employ organic compounds of trivalent arsenic or antimony in place of the phosphorous compounds used in the Reed catalyst. Such catalysts are described in some of the applicant's assignee's copending applications. Other disclosures suggest that trivalent nitrogen and bismuth compounds can be complexed with nickel. The catalyst compositions of the above described group are well known for their activity toward conjugated diolefins, particularly in the cyclization of conjugated acyclic polyolefins to produce the respective dimers, trimers and other cyclic polyolefins. The catalysts of this group have been employed with various catalysts activators, or have been the sole catalytic agents in the cyclization reactions as used by the prior art.

Cyclododecatriene is also known in the prior art and is described and disclosed by Reed and Wilke Patent 2,964,574, among others. Prior art investigators have carefully produced and characterized some of the various cis-isomers, trans-isomers, and cis,trans-isomers of cyclododecatriene, but were handicapped by the fact that the processes used to produce the cyclododecatriene gave relatively low yields of cyclododecatriene and at the same time gave fairly high selectivities of cyclooctadiene and other dimers. Thus, it can be seen that in the prior art the processes gave exceedingly small yields of cyclododecatriene which had to be isolated from large quantities of other products.

It is therefore an object of this invention to provide a method of producing high yields of trimers of acyclic conjugated diolefins. It is also an object of this invention to provide a process for producing cyclic tetramers and pentamers in recoverable commercial amounts.

It is still a further object of this invention to provide compositions of matter which when used as catalysts give heretofore uncommon yields of cyclodecatriene and other cyclic trimers of acyclic conjugated diolefins.

Further objects will be apparent to those skilled in the art upon consideration of the following description.

This invention is based upon the discovery that conjugated acyclic diolefins may be cyclized to give high yields of the trimer by subjecting the diolefins to the influence of a composition of matter having the following components:

(a) A nickel complex of the formula $$[(R'O_a)_3M]_xNi(CO)_{4-x}$$

in which R' is an organic radical, M is selected from the group consisting of arsenic, antimony and phosphorous, $a$ is an integer selected from 0 and 1, and $x$ is an integer selected from 1, 2, or 3; and (b) An organo metal compound selected from the group consisting of a lithium compound of the formula:

wherein $R^2$ is a hydrocarbyl radical; and an aluminum compound of the formula:

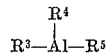

wherein $R^3$, $R^4$ and $R^5$ are the same or different alkyl radicals, or halogen with the proviso that at least one and preferably at least two, of $R^3$, $R^4$ and $R^5$ are alkyl radicals.

Certain of these compositions are novel.

As may be seen, the nickel complex which forms a part of the catalyst is a coordination compound of nickel in the zero-valent state.

The nickel complex which is used in this invention is generally prepared by the replacement of 1, 2, or 3 carbonyl groups of nickel tetracarbonyl by the desired organo metal ligand. Mixtures of these, such as bis(triorganophosphite)nickel dicarbonyl and tris(triorganophosphite)nickel carbonyl, are sometimes obtained. Such mixtures are useful in the present invention. These complexes are described in Patents 2,964,575—Sekul et al.; 2,972,640—Burks et al.; 2,991,317—Sellers et al.; and 3,004,081 — Bosmajian. Copending applications S.N. 50,969 filed August 22, 1960—Clark et al. and S.N. 84,766 filed January 25, 1961—Shechter, assigned to the applicants' assignee also describe these nickel complexes.

In the nickel complex, when the $a$ is zero, it will be seen that the $(R'O_a)_3M$ ligand includes phosphine, stibine and arsine compounds. When the $a$ is one, the ligand is a phosphite, arsenite or antimonite. The R' of the nickel complex formula is preferably a hydrocarbyl radical, although all operable organic radicals are contemplated as being useful.

Examples of hydrocarbyl radicals which are useful as R' are the alkyl radicals having from 1 to about 10 carbon atoms, such as methyl, ethyl, propyl, butyl, hexyl, dodecyl, isooctyl, isobutyl, isopentyl, 2-ethylpentyl, 3-propyloctyl, cyclopentyl, cyclohexyl, and cyclooctyl; aryl radicals such as phenyl, biphenyl, α-naphthyl, and β-naphthyl; aralkyl radicals such as benzyl and benzohydryl; and alkaryl radicals such as m-tolyl, p-tolyl, o-tolyl and 3,5-xylyl. Examples of suitable ligand-nickel carbonyl complexes useful according to the invention are triphenylphosphite nickel tricarbonyl, bis(triphenylthiophosphite)nickel dicarbonyl, bis(tritolylphosphite)nickel dicarbonyl, tris(triisooctylphosphite)nickel carbonyl, bis(triphenylantimonite)nickel dicarbonyl, bis(triphenylarsenite)nickel dicarbonyl, bis(triphenylphosphine)nickel dicarbonyl, bis(triphenylstibine)nickel dicarbonyl, and bis(triphenylarsine)nickel dicarbonyl. Others will be apparent from this description and/or are known as shown by the literature.

Although not within the preferred category, the above-mentioned radicals may be used when substituted with one or more halogen radicals, nitrogen containing radicals, sulfur containing radicals and/or oxygen containing groups. Also contemplated as being useful within the scope of this invention are nickel complexes having ligands with mixed hydrocarbyl substituents such as bis(phenyl-diethyl phosphine)nickel dicarbonyl, or bis(ethyldipropyl phosphine)nickel dicarbonyl.

The co-catalyst which is used with the nickel complex is selected from either a hydrocarbyl lithium compound, an alkyl aluminum halide, or an alkyl aluminum compound. In the case of the lithium compound, the hydrocarbyl radical has been designated as $R^2$ in the generic formula above. This hydrocarbyl radical is similar to $R^1$, for instance either acyclic or aromatic, with the lower aliphatic radicals having eight or less carbon atoms, being preferred. The preferred group thus includes ethyl, propyl, butyl, hexyl, heptyl, and octyl as well as their isomers. The less preferred group includes phenyl, tolyl, xylyl and the higher alkyl radicals such as nonyl and dodecyl.

The alternative cocatalysts, the trialkyl aluminum or alkyl aluminum halides may contain mixed alkyl groups as well as identical alkyl groups. The alkyl groups preferably contain from 1 to 8 carbon atoms per group, although the higher alkyl groups containing 20 or more carbon atoms are useful. Suitable halogens include chlorine, bromine, and iodine, chlorine being preferred. The hydrocarbyl radicals of the aluminum or lithium compounds may be the same as, or different than the organic radical of the nickel complex, and examples of suitable radicals are found above in the description of $R'$ and $R^2$, as well as in the literature. Thus, suitable aluminum compounds are, for instance, triethyl aluminum, diethyl aluminum chloride, ethyl aluminum dichloride, tripropyl aluminum, and mixtures thereof, such as triethyl aluminum and ethyl aluminum dichloride.

The new compositions of matter which comprise this invention may be prepared by mixing the desired amounts of the nickel complex and the organo metal compound. The mixing is at times accompanied by a change in the color of the resulting mixture—evidencing a chemical reaction of the components. The mixture may be stored under argon, nitrogen, or other inert atmosphere. The precise nature of the resulting mixture is not known. Possibily the active catalyst may not form until the catalyst mixture is contacted with the diolefin being reacted to form cyclic polyolefins; for example when butadiene is mixed with the catalyst, an obvious reaction takes place in a short time.

The mixing step is suitably carried out at room temperature, about 20° C., although temperatures of from about 0° to 150° C. are useful. The catalyst is ordinarily prepared in a common hydrocarbon solvent, or other organic solvent inert with respect to the catalyst components. Suitable conventional inert solvents include, for example, pentane, hexane, cyclopentane, cyclohexane, ethyl cyclohexane, benzene toluene, and bromobenzene. While the solvent may be removed or reduced in quantity as by vacuum evaporation, it is ordinarily introduced into the reaction vessel with the catalyst. The catalyst may be prepared in situ by introducing the catalyst components and the diolefin such as butadiene into the reactor.

The following examples, 1 through 5, illustrate the preparation of the composition of matter. Although these examples set forth the preferred conditions, it will be understood that other conditions may be successfully employed.

*Example 1*

Two-tenths of a gram of bis(triphenyl phosphine)nickel dicarbonyl was dissolved in 33 grams of toluene. Six-tenths of a milliliter of 19% butyl lithium was then added to the toluene solution of the nickel complex, to give a Li/Ni ratio of about 3/1. The toluene solution of the nickel complex darkened somewhat upon the addition of the butyl lithium, but no heat was liberated.

*Example 2*

Two grams of bis(triisooctylphosphite)nickel dicarbonyl was dissolved in 30 grams of benzene. To this solution, 4.8 millimoles of triethyl-aluminum was added, giving an Al/Ni ratio of about 2.3/1.

*Example 3*

One gram of bis(triphenyl arsine) nickel dicarbonyl was dissolved in 30 grams of benzene. To this benzene solution was added 1.6 ml. of 19% butyl lithium solution. This represents a Li/Ni ratio of 2.3/1.

*Example 4*

One-half gram of bis(triphenylphosphite)nickel dicarbonyl was combined with 2.1 millimoles of diethyl aluminum chloride, in 25 ml. of hexane, under an inert gas. The molar ratio of Al/Ni was about 3/1.

*Example 5*

Bis(trisooctylphosphite)nickel dicarbonyl, in the amount of 1 g. or 1.05 millimoles was mixed with 3.1 millimoles of $(C_2H_5)_2AlCl$. Twenty milliliters of hexane was the solvent. The Al/Ni ratio was about 3/1.

When the new compositions of matter of this invention are to be used as catalysts for the production of cyclic trimers of acyclic conjugated diolefins, a molar ratio of the organo metal compound to the nickel complex of from about 300 to 1 to about 1 to 300 may be used, although other ratios are useful. A preferred molar ratio of alkyl lithium to the nickel complex is between 1 to 1 and 5 to 1. For the aluminum compound, a ratio of Al to Ni of between about 1 to 1 and about 20 to 1 is preferred. The foregoing illustrate the production of catalysts having the preferred ratios of cocatalyst to nickel complex.

When the new compositions of matter of this invention are to be used as cyclization catalysts, and particularly to produce cyclododecatriene, it has been found that a bis(triorganophosphine) nickel dicarbonyl complex combined with a lithium compound, such as butyl lithium gives excellent results. When the bis(triorganophosphite nickel) dicarbonyl complex was used, good results were achieved with an alkyl aluminum such as triethyl aluminum, as cocatalyst. The combination of a bis(triorganoarsine)nickel dicarbonyl complex with a hydrocarbyl lithium or a trialkyl aluminum has also shown superior results.

The following examples illustrate the use of the catalyst combinations in cyclization reactions, but it will be understood that these combinations are merely illustrative of the preferred mode of conducting the reaction and that many other combinations are within the scope of this invention.

*Example 6*

The catalyst from Example 1 (0.3 gram of catalytic material with a Li/Ni ratio of 3/1) was placed in a 300 ml. autoclave which had previously been purged with argon. After the catalyst had been charged, the autoclave was evacuated to remove air and argon. Seventy-three grams of butadiene was charged to the autoclave and the temperature was raised to 140° C. The autoclave was held at 140° C. for 45 minutes. After cooling and venting the unreacted butadiene, 104 grams of reaction mixture was removed from the autoclave. This represented a 95% conversion of the butadiene, assuming no toluene loss. The selectivities were 54% for cyclododecatriene, 37% for cyclooctadiene and 7% for vinylcyclohexene.

*Example 7*

The catalyst of Example 2 (2.6 grams of catalytic material with an Al/Ni ratio of 2.3/1) was charged into a 300 ml. autoclave which previously had been purged with argon. After the catalyst had been added, the autoclave was evacuated to remove air and argon. Seventy-five grams of butadiene was charged to the reactor and the temperature was raised to 80° C. The autoclave was held at 80° C. for 16 hours. The autoclave was cooled and vented, and 76 grams of crude reaction product was removed from the autoclave. This represented a 61% conversion of the butadiene assuming no benzene loss. The selectivities, based on infrared analyses, were 63% for cyclododecatriene, 28% for cyclooctadiene and 7% for vinyl cyclohexene.

*Example 8*

The catalyst of Example 3 (1.2 grams of catalytic material with a Li/Ni ratio of 2.3/1) was added to a 300 ml. autoclave which previously had been purged with argon. After the catalyst was charged, the autoclave was evacuated to remove all traces of argon and air. The autoclave was then charged with 75 grams of butadiene and heated to 110° C. The autoclave was held at 110° C. for 3.5 hours. The autoclave was then cooled and vented, and 112 grams of reaction material was removed. This represented a conversion of 96% of the butadiene assuming no benzene loss. Analysis of the crude reaction mixture gave yields of 12.5% cyclooctadiene, 54.8% cyclododecatriene, 4.5% vinylcyclohexene and 28% benzene. This represented selectivities of 76% for cyclododecatriene, 17% cyclooctadiene, and 6% vinyl cyclohexene.

*Example 9*

Using the procedure of Example 6 and the catalyst of Example 4 including the hexane in which it was prepared (2.6 g. of a mixture derived from [$(C_6H_5O)_3P]_2Ni(CO)_2$ and $(C_2H_5)_2AlCl$ with a ratio of Al/Ni of 3/1 in 25 ml. of hexane) was introduced into a reactor with 101 g. of butadiene. The reaction was conducted at 125° C. for 2.5 hours. The conversion of butadiene to products was 65%. The catalyst was killed with methanol, and the product analyzed. The selectivities were:

| | Percent |
|---|---|
| Vinylcyclohexene | 10.5 |
| Cyclooctadiene-1,5 | 43 |
| Cyclododecatriene-1,5,9 | 11 |

The remainder of the product had a boiling point higher than cyclododecatriene.

*Example 10*

Following the steps of Examples 6–9, with 4.1 g. of the catalyst of Example 5 in 20 ml. of hexane (an Al/Ni ratio of 3/1), 94 g. of butadiene was heated to a temperature of 125° C. for 2 hours. The conversion was 88%. The catalyst was inactivated by the method of Example 9. The conversion of butadiene was 88% and the selectivities for products as follows:

| | Percent |
|---|---|
| Vinylcyclohexene | 21 |
| Cyclooctadiene-1,5 | 47 |
| Cyclododecatriene-1,5,9 | 24 |

The remainder of the product was material having a higher molecular weight.

*Example 11A*

Additional batch runs were made using a two liter autoclave as the batch reactor. Bis-triisooctylphosphite nickel dicarbonyl-triethylaluminum was used as the catalyst in a weight ratio of 1 (Ni) to 0.3 (Al). The catalyst was placed in the reactor, the reactants were charged to the cold (ambient temperature) reactor, and the autoclave was then rapidly heated to 80° C. with the agitator running. The zero time for the reaction was defined as the moment the operating temperature was reached (usually about ten minutes after charging). The original charge composition for all runs consisted of 90% by weight of butadiene and 10% by weight of a benzene solution containing 1.3% by weight (based on the butadiene) of the above described catalyst composition. All runs, from the following table were carried out at 80° C.

| Run | A | B | C | D |
|---|---|---|---|---|
| Time after start, min | 360 | 690 | 1,275 | 1,335 |
| Reaction Pressure, p.s.i.g | 155 | 140 | 80 | 70 |
| Yield: | | | | |
| Vinylcyclohexene | 1.3 | 3.0 | 7.5 | 8.7 |
| Cyclooctadiene | 0.3 | 8.4 | 16.7 | 20.8 |
| Cyclododecatriene | 1.9 | 14.1 | 25.0 | 29.5 |
| Conversion | 3.6 | 26.6 | 54.1 | 65.6 |
| Selectivities: | | | | |
| Vinylcyclohexene | 37.1 | 11.8 | 15.3 | 16.9 |
| Cyclooctadiene | 8.6 | 32.9 | 33.9 | 35.1 |
| Cyclododecatriene | 54.3 | 55.3 | 50.8 | 50.0 |

*Example 11B*

Additional batch runs were made using a two liter autoclave as the batch reactor. Bis-triisooctylphosphite nickel dicarbonyl-triethylaluminum was used as the catalyst in a weight ratio of 1 (Ni) to 0.3 (Al). The catalyst was placed in the reactor, the reactants were charged to the cold (ambient temperature) reaction, and the autoclave was then heated to 90° C. with the agitator running. The zero time for the reaction was defined as the moment the operating temperature was reached (usually about ten minutes after charging). The original charge composition for all runs consisted of 90% by weight of butadiene and 10% by weight of a benzene solution containing 1.3% by weight (based on the butadiene) of the above described catalyst composition. All runs, from the following table, were carried out at 90° C.

| Run | E | F | G | H |
|---|---|---|---|---|
| Time after start, min | 355 | 430 | 465 | 490 |
| Reaction Pressure, p.s.i.g | 150 | 140 | 120 | 100 |
| Yield: | | | | |
| Vinylcyclohexene | 3.8 | 7.7 | 9.4 | 9.8 |
| Cyclooctadiene | 11.1 | 18.9 | 21.7 | 21.2 |
| Cyclododecatriene | 13.5 | 24.7 | 28.7 | 28.6 |
| Conversion | 31.7 | 58.9 | 68.8 | 67.0 |
| Selectivities: | | | | |
| Vinylcyclohexene | 13.1 | 15.1 | 15.7 | 16.4 |
| Cyclooctadiene | 39.1 | 36.8 | 36.3 | 35.6 |
| Cyclododecatriene | 47.5 | 48.1 | 48.0 | 48.0 |

Vapor phase chromatographic analyses have also been used, with comparable results, as in Example 11. A suitable gas chromatography column is packed with an adsorption media comprised of ethylene glycol, silver nitrate, and chromosorb or other similar material such as small pieces of firebrick.

The yields of the various oligmers in the foregoing Examples 6–10 were determined by the use of a Baird-Atomic Infrared spectrophotometer, Model 455. The infrared determination of the vinylcyclohexene, cyclooctadiene, and cyclododecatriene was achieved from the previously established absorption maximum and the absorption minimum for these products. It was found that better accuracy and precision was obtained by calibrating with pure standard daily than by using a predetermined calibration constant, so this was done. The product concentration was calculated from the expression:

$$\text{Wt. percent product} = \frac{\text{absorbance of sample} \times 100}{\text{absorbance of standard}}$$

It is preferred to use the catalyst of this invention in a solvent although solvents are not necessary under all conditions. The solvent for the catalyst may be the same as the one in which it is prepared, or different therefrom, and is suitably an aromatic hydrocarbon such as benzene, toluene, xylene, or the like or a halogenated aromatic such as chlorobenzene, chloronaphthalene, or orthodichlorobenzene. Aliphatic alkanes or cycloalkanes such as pentane, hexane, heptane or cyclohexane also are useful. Other solvents which may be used include ethyl benzene, isopropyl benzene, ethyl toluene, n-propyl benzene, diethyl benzene, mono- and dialkyl naphthalenes, n-pentane, n-octane, isooctane, methyl cyclohexane, tetralin, decalin, and any other solvent which is inert with respect to the catalyst, the reactants, and the products and which will not interfere with the recovery and purification of the product. In general, any solvent known to be useful in prior art cyclization reactions is useful, keeping in mind the above criteria. Solvents may be omitted entirely, the monomers serving as solvents for the catalysts.

The time required to carry out the cyclization reaction may be varied as desired and will usually be of the order of from 30 minutes to 20 hours or more, depending upon the exact catalyst used, temperature and so forth. Contact times of 45 minutes to 30 hours, as shown in Examples 6 through 11 above, are commonly employed in autoclave type reactions. When a continuous process is employed, the contact time in the cyclization reaction can be regulated as desired, and in some cases it is not necessary to employ reaction times much beyond one-half of the batch process time. Pressures of 10 p.s.i.g. to 1000 p.s.i.g. are conveniently used.

The cycloolefin products resulting from the cyclic polymerization of an aliphatic conjugated diolefin in the presence of the herein described catalyst system may be recovered by a variety of known means. Thus, the cycloolefin products may be recovered using techniques such as fractional distillation, steam distillation and crystallization with or without refrigeration. For example, after decomposing the catalyst system, the principal cycloolefin products may be separated from inorganic constituents and higher boiling material by steam distillation, the organic material separated from the water layer, dried and fractionally distilled to obtain the pure cycloolefins. Other types of recovery processes will be obvious to those skilled in the art. Normally a polymerization inhibitor or antioxidant such as those mentioned above in connection with butadiene, is added immediately after recovery of the products.

Although the above cyclization examples are all directed to the use of butadiene as the monomer, it will be understood that other acyclic conjugated diolefins are equally useful. The 1,3-diolefins such as 2-methyl-1,3-butadiene (isoprene); 1,3-pentadiene (piperylene); 2-chloro-1,3-butadiene (chloroprene); 2,3-dichloro-1,3-butadiene; and 2,3-dimethyl-1,3-butadiene, are particularly preferred. Other compounds which form cycloolefins such as the phenyl-diolefins and 2,4-hexadiene may also be used. The products, for instance in the case of isoprene would of course comprise products analogous to cyclooctadiene and cyclododecatriene, such as dimethyl cyclooctadiene and trimethyl cyclododecatriene.

The diolefin should be relatively pure, although it may comprise relatively small amounts of impurities inherently present such as water, monoolefins, 1,3-diolefins, carbonyl compounds such as aldehydes, and acetylenes. Normally these materials inherently appear in "plant" butadiene in amounts between about 10 p.p.m. (parts per million) and 600 p.p.m., by weight. Excessive amounts of certain impurities react with the catalyst or are detrimental in other ways and if not removed, are wasteful of catalyst, for example. The quantity of water in the diolefin monomer may be reduced by freezing or by the use of desiccants or dehydrating agents such as calcium sulfate (e.g., "Drierite"), calcium carbide, calcium oxide, or others known in the art. Ferrous salts, thiosulfites, sulfites, or other materials may be used to reduce peroxide compounds.

Best results are obtained where relatively dry materials are introduced into the reaction zone. The catalyst, solvent (if used), and monomer should contain no more water than will give about 500 p.p.m. (parts per million) by weight of water in the liquid reaction mixture. For example, using no extraneous solvent and a dry catalyst with butadiene, reduction of the water content of the diolefin to about 100 p.p.m. gives excellent results; in fact, greatly better results are not apparent when the moisture is reduced to 50 p.p.m. or below. Excessive moisture reduced both total conversion and selectivity for cyclooligomers having eight or more ring carbons.

Examples 6 through 11 above employ as a feed typical "plant" butadiene of the following analysis:

| | Percent |
|---|---|
| Butadiene-1,3 | 98.36 |
| Isobutane | 0.00 |
| n-Butane | 0.00 |
| Isobutylene | 0.025 |
| Trans-butene-2 | 0.065 |
| Cis-butene-2 | 0.065 |
| Propylene | 0.58 |
| Propadiene | 0.075 |
| Butadiene-1,2 | 0.10 |
| Acetylenes | 0.06 |
| Carbonyl | 0.002 |
| $H_2O$ | 0.02 |

Isobutane and butane are commonly present in small amounts. The total acetylenes commonly range from about 0.05% to 0.09% by weight in butadiene of about 98.5% purity. The acetylenic constituents of a similar butadiene sample were analyzed by gas chromatography, and the following compounds and amounts were found:

| Component: | Mole percent |
|---|---|
| Methylacetylene | 0.02 |
| Ethylacetylene | 0.04 |
| Dimethylacetylene | 0.01 |
| Vinylacetylene | 0.002 |

As can be seen, the diolefins as used in the examples contained other unsaturated hydrocarbons having 3-4 carbon atoms.

The diolefins useful according to the invention are those produced by conventional processes. For instance, the butadiene used in the above examples was prepared in a commercial plant by the dehydrogenation of butene, followed by purification with cuprous ammonium acetate. A crystalline complex of the cuprous ammonium acetate with butadiene is formed, and the butadiene is released from the complex by the application of heat. As has been known since 1950 and earlier, from commercial butadiene plant operation in this country, this process gives butadiene of about 95% to 99% purity with little variation for a given set of conditions. Before use in the trimerization reaction the "plant" butadiene was flowed through anhydrous calcium sulfate granules (e.g., "Drierite") in order to reduce the water content to the neighborhood of 100 p.p.m. and to remove a substantial proportion of the polymerization inhibitor.

For the purpose of producing cyclic polyolefins and particularly cyclic trimers according to the invention, the catalyst concentration may be from 0.01% to about 10% or higher based upon the weight of the feed. The upper limitation, i.e., 10% is not critical since higher catalyst concentrations do not inhibit the cyclization reaction, but on the other hand catalyst concentrations in excess of 10% do not improve the reaction and only increase the cost of the operation. A concentration of from about 0.5% to 3% is preferred.

The temperature at which the cyclization reaction takes place will depend upon the exact catalyst used, the catalyst concentration, the feed pressure, and so forth. It has been determined that temperatures of from about 40° C. to about 250° C. are suitable for producing cyclic trimers with the catalysts of this invention, from about 60° C. to 140° C. being preferred. Examples 6 through 11 illustrate the use of reaction temperatures of from 80° C. to 140° C., which is within the preferred range of reaction temperatures.

For the purpose of this patent application the term "butadiene" refers to 1,3-butadiene; the term "vinylcyclohexene" refers to 4-vinylcyclohexene; the term "cyclooctadiene" refers to 1,5-cyclooctadiene; and the term "cyclododecatriene" refers to 1,5-9-cyclododecatriene.

For the purpose of this patent application the term "hydrocarbyl" is intended to mean an organic radical made up exclusively of hydrogen and carbon atoms. Phosphorus is defined as a metal in this application.

Within this application the terms "conversion," "yield" and "selectivity" shall be defined as follows:

$$\text{Conversion} = \frac{\text{wt. of feed reacted} \times 100}{\text{wt. of feed}}$$

$$\text{Yield} = \frac{\text{wt. of particular product} \times 100}{\text{wt. of feed}}$$

$$\text{Selectivity} = \frac{\text{wt. of particular product} \times 100}{\text{wt. of feed reacted}}$$

We claim:

1. A composition of matter which comprises the product derived from admixture of materials consisting essentially of (a) a nickel complex of the formula:

$$[(R'O_a)_3M]_xNi(CO)_{4-x}$$

wherein R' is a hydrocarbyl radical, M is selected from the group consisting of arsenic, antimony and phosphorous; $a$ is an integer selected from 0 and 1; and $x$ is an integer selected from 1, 2 and 3; and (b) at least one organo metal compound selected from the group consisting of a lithium compound of the formula:

$$R^2Li$$

wherein $R^2$ is a hydrocarbyl radical, and an aluminum compound of the formula:

$$R^3-\underset{\underset{R^4}{|}}{Al}-R^5$$

wherein $R^3$, $R^4$ and $R^5$ are alkyl radicals.

2. The composition of claim 1 wherein M is phosphorus.
3. The composition of claim 1 wherein M is arsenic.
4. The composition of claim 1 wherein M is antimony.
5. The composition of matter of claim 1 which comprises the product derived from admixture of materials consisting essentially of (a) bis(triisooctylphosphite) nickel dicarbonyl and (b) triethylaluminum.
6. The composition of matter of claim 1 which comprises the product derived from admixture of materials consisting essentially of (a) bis(triphenylphosphine) nickel dicarbonyl and (b) butyl lithium.
7. The composition of matter of claim 1 which comprises the product derived from admixture of materials consisting essentially of (a) bis(triphenyl arsine) nickel dicarbonyl and (b) butyl lithium.
8. A process of preparing cyclic polyolefins including those having 12 carbon atoms in the ring comprising subjecting an acyclic conjugated diolefin monomer to the direct influence of a catalyst derived from admixture of materials consisting essentially of (a) a nickel complex of the formula:

$$[(R'O_a)_3M]_xNi(CO)_{4-x}$$

wherein R' is a hydrocarbyl radical, M is selected from the group consisting of arsenic, antimony, and phosphorous; $a$ is an integer selected from 0 and 1; and $x$ is an integer selected from 1, 2 and 3; and (b) at least one organo metal compound selected from the group consisting of a lithium compound of the formula:

$$R^2Li$$

wherein $R^2$ is a hydrocarbyl radical, and an aluminum compound of the formula:

$$R^3-\underset{\underset{R^4}{|}}{Al}-R^5$$

wherein $R^3$, $R^4$ and $R^5$ are alkyl radicals, said influence being at a temperature of between about 40° C. and about 250° C.

9. The process of claim 8 in which said organo metal compound is $R^2Li$, said temperature is below 140° C., and said diolefin is butadiene.

10. The process of claim 8 in which said organo metal compound is $$R^3-\underset{\underset{R^4}{|}}{Al}-R^5$$

wherein $R^3$, $R^4$ and $R^5$ are alkyl radicals, said temperature is below 140° C., and said diolefin is butadiene.

11. The process of claim 8 in which said diolefin is butadiene, said catalyst is derived from admixture of catalyst components consisting essentially of (a) bis(triisooctylphosphite) nickel dicarbonyl and (b) a trialkyl aluminum, the atomic ratio of Al:Ni being from 1:1 to 20:1, at a temperature between 60 and 140° C. and for a finite time, and recovering said cyclic polyolefins.

12. The process of claim 8 in which said diolefin is butadiene, said catalyst is derived from admixture of catalyst components consisting essentially of (a) bis(triphenylarsine) nickel dicarbonyl and (b) a trialkyl aluminum, the atomic ratio of Al:Ni being from 1:1 to 20:1, at a temperature between 60 and 140° C. and for a finite time, and recovering said cyclic polyolefins.

13. The process of claim 8 in which said diolefin is butadiene, said catalyst is derived from admixture of catalyst components consisting essentially of (a) bis(triphenylphosphine) nickel dicarbonyl and (b) a hydrocarbyl lithium, the atomic ratio of Li:Ni being from 1:1 to 5:1 at a temperature between 60 and 140° C. and for a finite time, and recovering said cyclic polyolefins.

14. The process of claim 8 in which said diolefin is butadiene, said catalyst is derived from admixture of catalyst components consisting essentially of (a) bis(triphenylarsine) nickel dicarbonyl and (b) a hydrocarbyl lithium, the atomic ratio of Li:Ni being from 1:1 to 5:1 at a temperature between 60 and 140° C. and for a finite time, and recovering said cyclic polyolefins.

References Cited by the Examiner

UNITED STATES PATENTS

| | | | |
|---|---|---|---|
| 2,903,491 | 9/1959 | Reppe et al. | 260—666 |
| 2,964,575 | 12/1960 | Sekul | 260—666 |
| 2,969,408 | 1/1961 | Nowlin | 252—431 |

FOREIGN PATENTS

| | | |
|---|---|---|
| 219,580 | 2/1962 | Austria. |
| 598,363 | 6/1961 | Belgium. |
| 917,103 | 1/1963 | Great Britain. |

DELBERT E. GANTZ, *Primary Examiner.*

ALPHONSO D. SULLIVAN, *Examiner.*

C. E. SPRESSER, V. O'KEEFE, *Assistant Examiners.*